(12) United States Patent  (10) Patent No.: US 7,609,286 B2
Cupal et al.  (45) Date of Patent: Oct. 27, 2009

(54) METHOD AND APPARATUS FOR VIDEO CONFERENCING

(75) Inventors: Matthew D. Cupal, Providence, UT (US); Dave Perkes, North Logan, UT (US); Doug Jewell, Paradise, UT (US); Scot Brooksby, Highland, UT (US)

(73) Assignee: Sorenson Communications, Inc., Salt Lake City, UT (US)

( * ) Notice: Subject to any disclaimer, the term of this patent is extended or adjusted under 35 U.S.C. 154(b) by 509 days.

(21) Appl. No.: 10/754,104

(22) Filed: Jan. 8, 2004

(65) Prior Publication Data

US 2005/0151833 A1  Jul. 14, 2005

(51) Int. Cl.
*H04N 7/14* (2006.01)
*H04Q 12/16* (2006.01)

(52) U.S. Cl. ............... 348/14.01; 348/14.04; 348/14.08

(58) Field of Classification Search ... 348/14.07–14.08, 348/14.9, 14.1, 14.11–14.13; 370/260, 261, 370/352
See application file for complete search history.

(56) References Cited

U.S. PATENT DOCUMENTS

| 4,560,833 | A | 12/1985 | Weber et al. |
| 5,079,627 | A | 1/1992 | Filo |
| 5,448,286 | A | 9/1995 | Decaesteke et al. |
| 5,510,829 | A | 4/1996 | Sugiyama |
| 5,610,975 | A | 3/1997 | Tsuchida |
| 5,966,165 | A | 10/1999 | Eddington |
| 5,999,966 | A | 12/1999 | McDougall et al. |
| 6,020,915 | A | 2/2000 | Bruno et al. |
| 6,339,593 | B1 | 1/2002 | Kikinis |
| 6,456,615 | B1 | 9/2002 | Kikinis |
| 6,519,662 | B2 | 2/2003 | Clapp et al. |
| 6,621,514 | B1 | 9/2003 | Hamilton |
| 6,654,825 | B2 | 11/2003 | Clapp et al. |
| 2002/0018115 | A1* | 2/2002 | Sakata ..................... 348/14.08 |
| 2002/0044199 | A1* | 4/2002 | Barzebar et al. ......... 348/14.01 |
| 2002/0083462 | A1 | 6/2002 | Arnott |
| 2003/0031169 | A1* | 2/2003 | Emerson, III ............... 370/352 |
| 2003/0222973 | A1* | 12/2003 | Hiroi et al. ................ 348/14.01 |
| 2004/0010464 | A1* | 1/2004 | Boaz ........................... 705/40 |
| 2005/0057644 | A1* | 3/2005 | Huang ..................... 348/14.01 |

\* cited by examiner

*Primary Examiner*—Melur Ramakrishnaiah
(74) *Attorney, Agent, or Firm*—TraskBritt, P.C.

(57) ABSTRACT

A videoconferencing system couples to a network for providing videoconferencing services to a user. The videoconferencing session is controlled and initiated by a user in a manner consistent with establishing a conventional audio-only session. In one embodiment, an independently operable voice-only telephone handset couples to an audio and video communication device. The videoconferencing session is established by taking the telephone handset to an off-hook status and entering a dialed phone number sequence. The audio and video communication device retrieves a network address corresponding to the dialed phone number sequence and initiates a call sequence corresponding to the retrieved network address until the telephone handset goes into an on-hook status. The audio and video communication device further includes video interfaces for presenting the video aspects to the user.

23 Claims, 2 Drawing Sheets

METHOD AND APPARATUS FOR VIDEO CONFERENCING

BACKGROUND OF THE INVENTION

1. Field of the Invention

The present invention relates generally to video teleconferencing and, more specifically, relates to controlling a videoconferencing system utilizing a user-familiar interface.

2. State of the Art

Telephony has long involved the exchange of audio information between called and calling parties. To enhance the interactive experience between parties, further exchange of information including video or image information has been proposed and implemented. Conventional videoconferencing requires a significant amount of bandwidth in order to exchange high-bandwidth video data. Specifically, dedicated high-bandwidth communication channels were required; however, with the expansion of data networks which include high-bandwidth capability, videoconferencing for the masses is becoming more practical.

Conventional classes of videoconferencing systems include "group systems" designed for presentation to a plurality of individuals since the associated costs and infrastructure has heretofore been individually prohibitive. A typical videoconferencing group system includes a system designed for placement on a conference table with a projection system coupled to a display such as a large television monitor. Control of the group class videoconferencing system has typically occurred through a sophisticated menu structure controlled by a remote control. As stated, such group systems have typically been targeted for business applications and mastery of operation typically requires extensive familiarity with the system.

Another class of videoconferencing systems includes computer-based systems that operate on a computer platform with executing software. A typical computer-based videoconferencing system includes a camera coupled to the computer with the videoconferencing system being controlled via a mouse or keyboard that is interactive with a graphical user interface of the computer.

The complexity and costs of both the group and computer-based videoconferencing systems, in addition to the lack of affordable high-bandwidth channels, has tended to exclude the masses from participating in videoconferencing. Additionally, conferencing systems to date have included additional complexities such as buttons and menus that have required activation by a user prior to facilitating a videoconferencing session. Such additional activation and configuration prior to conducting a videoconferencing session has been cumbersome and intimidating for the masses. Therefore, due to the complexity of interface with the user, neither the group class or conventional computer-based videoconferencing solutions lend themselves to being widely adopted by the masses. Therefore, there exists a need for a method and system for videoconferencing which includes an improved interface environment for the user that is more intuitive and more easily embraced.

BRIEF SUMMARY OF THE INVENTION

The present invention is directed to a method and apparatus for videoconferencing. In one embodiment of the present invention, an audio and video communication device is provided. The device includes an interface for compatibly coupling and interoperating with an independently operable voice-only telephone handset. The telephone handset provides the audio interface for inputting and outputting the audio portion of the videoconferencing session and further includes an interface for transmitting and receiving voice and image data over a network. The audio and video communication device further includes a controller coupled with both interfaces. The controller is configured to establish the audio and video communication session in response to the telephone handset going off-hook.

In another embodiment of the present invention, a videoconferencing system is provided. The videoconferencing system includes an independently operable voice-only telephone handset and an audio and video communication device. The audio and video communication device includes a controller configured to support an audio channel with the telephone handset. The controller is further configured to support a video channel with video devices and is further configured to support an audio and video channel with a network.

In yet another embodiment of the present invention, a method is provided for establishing an audio and video communication session. When a telephone handset goes into an off-hook status and a dialed phone number sequence is detected, a network address is retrieved which corresponds to the dialed phone number sequence. A call sequence is initiated corresponding to the network address until the telephone handset goes back to an on-hook status.

Other features and advantages of the present invention will become apparent to those of skill in the art through a consideration of the ensuing description, the accompanying drawings, and the appended claims.

BRIEF DESCRIPTION OF THE DRAWINGS

In the drawings, which illustrate what is currently considered to be the best mode for carrying out the invention.

DETAILED DESCRIPTION OF THE INVENTION

The various aspects and embodiments of the present invention enable a user of a videoconferencing system to activate and utilize the videoconferencing system in a manner common and intuitive to a user's experience with the operation of a traditional telephone. That is to say, rather than requiring configurations or activation of a separate videoconferencing device, a videoconference session is initiated in the same manner as placing a traditional audio-only telephone call, namely through the lifting of a receiver portion of a telephone handset followed by the dialing of a sequence of digits on the keypad of the telephone handset.

Figure 1:
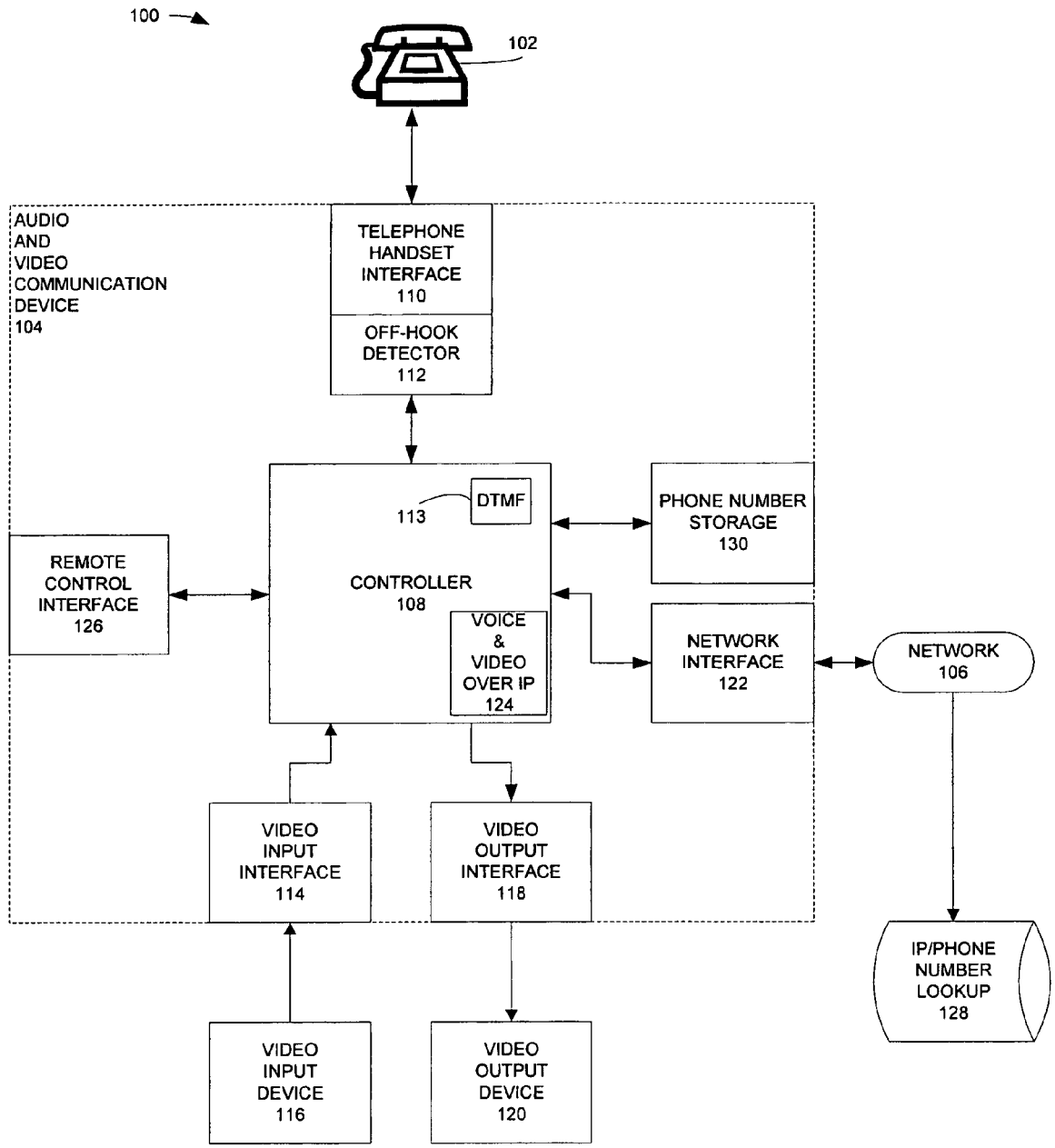
FIG. 1 illustrates a block diagram of a video communication system, in accordance with an embodiment of the present invention.

FIG. 1 illustrates a videoconferencing system configured to enable the establishment of a videoconferencing session activated only through the utilization of a conventional audio-only telephone handset, in accordance with an embodiment of the present invention. A videoconferencing system 100 includes a telephone handset 102 coupled with an audio and video communication device 104. Telephone handset 102 is configured in accordance with standard telephone interface protocols, an example of which is POTS (Plain Old Telephony Service). Telephone handset 102 is further configured to include a microphone and speaker for receiving and generating audio, in accordance with an audio portion or channel of the conferencing session and may be further implemented as a corded or cordless telephone handset.

Audio and video communication device 104 is further configured with various interfaces, one of which is a telephone handset interface 110 providing both a mechanical and electrical interface with telephone handset 102. Telephone handset interface 110 may be implemented in one embodiment as a subscriber line interface circuit (SLIC), the specific specifications of which are known by those of ordinary skill in the art. Telephone handset interface 110 may further include an off-hook detector 112 which determines when telephone handset 102 becomes activated due to the removal of the hand-held portion of telephone handset 102 or similar off-hook activation, an example of which includes the activation of a speakerphone. Telephone handset interface 110 further includes any necessary voltage regulation for coupling with telephone handset 102.

Telephone handset interface 110 may be further configured as a "ringing SLIC" thereby enabling the ringing or alerting operation of videoconferencing system 100 to be performed by telephone handset 102. Alternatively, the ringing function may be performed within a portion of audio and video communication device 104 causing an alerting or ringing signal to be generated therein. Additionally, detection of dialing commands in the form of tones from telephone handset 102 may be detected within telephone handset interface 110 or may be alternatively passed through to a controller 108 having DTMF (dual-tone multi-frequency) circuitry 113 therein. Such DTMF circuitry or DTMF process decodes the tones generated by telephone handset 102 into digits used for identifying a dialed telephone number sequence.

Audio and video communication device 104 further includes a controller 108 for electrically and operatively coupling with the various interfaces, one of which includes telephone handset interface 110. Controller 108 may be implemented as a microcontroller or microprocessor operating in accordance with one or more software processes and may further include an operating system operating thereon.

Audio and video communication device 104 further includes a video interface illustrated as including video input interface 114 and video output interface 118. Video input interface 114 couples to a video input device 116, an example of which is a video camera or other imaging input devices, a specific example of which may include CCDs or other imaging input devices. Video output interface 118 is further implemented for coupling with a video output device 120 an example of which includes a video monitor which may be coupled according to various standards, an example of which is an NTSC (National Television Systems Committee) standard. It should also be appreciated that video input device 116 and/or video output device 120 may be integrated within audio and video communication device 104.

Audio and video communication device 104 further includes a network interface 122 configured to provide a physical and electrical interface with a data network 106. Network interface 122 may be implemented, in one example, as an Ethernet standard as well as other networking standards and protocols including the IP protocol. Network 106 may be implemented as a wide area or local area network, an example of which is the Internet.

Videoconferencing system 100 further includes a network address, such as an IP phone number lookup table or database 128 which enables a cross-referencing of a specific targeted telephone handset with a session assigned network address, an example of which is an IP address. By way of example, when power is asserted in one embodiment to audio and video communication device 104, the device autodetects its IP address from other services that reside on network 106 and registers that IP address as currently assigned with the phone number that may have been stored in the audio and video communication device 104 in a phone number storage 130. Phone number storage 130 is preferably implemented as a nonvolatile memory or storage device which may include an assigned number, serial number, or MAC (media access control) number identifying a unique audio and video communication device 104.

In accordance with one embodiment of the present invention, during a power up scenario of audio and video communication device 104, device 104 goes out onto network 106 on a server that may be independent of the present invention to retrieve an IP address that is assigned for the duration of its session. Upon getting the IP address, audio and video communication device 104 transmits that IP address via network 106 to IP phone number lookup database 128 for correlation with an assigned phone number identifying a specific video conferencing system 100 as may have been stored in phone number storage 130. During operation, an audio and video communication device 104 coupled with a telephone handset 102 may perform a videoconferencing session with a similar or related configuration of an audio and video communication device 104 in telephone handset 102. During the establishment of a particular session, each specific device stores in IP phone number lookup database 128 the network address (e.g., IP address) and a corresponding assigned identifier such as a phone number corresponding to the phone number sequence which may have been stored in phone number storage 130. Therefore when a videoconference session is established, audio and video communication device 104 goes out on the network 106 and retrieves an IP address from IP phone number lookup database 128 corresponding to the destination device. Interaction for exchange of communication data is thereupon performed across network 106 using IP addresses in accordance with established networking protocols.

One such communication protocol is illustrated as voice and video over IP 124, the standards and specifics of which are known by those of ordinary skill in the art. Such a protocol may interpret the signals coming in from the video and audio interfaces and encodes those data into a format for distribution over network 106 such that they can be decoded at the destination device and displayed back through the corresponding audio and video devices.

Audio and video communication device 104 may further include a remote control interface 126 used to accommodate and control additional sophistication within audio and video communication device 104. For example, remote control interface 126 may facilitate the modification of the video display or audio quality as well as enabling other enhanced or sophisticated features not readily configurable through telephone handset 102. It should be noted, however, that the various embodiments of the present invention facilitate a simplified establishment of a voice and video communication session that can be initiated according to well established and familiar audio-only telephone call interactions.

Figure 2:
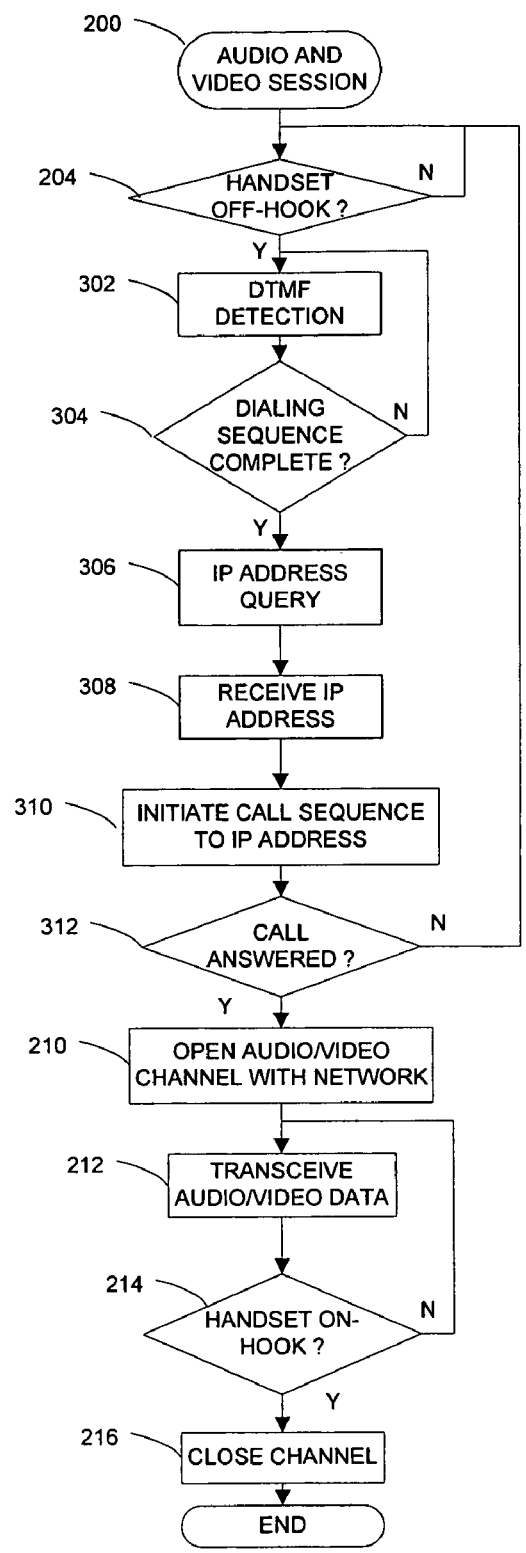
FIG. 2 is a flowchart of forming a videoconferencing session, in accordance with an embodiment of the present invention.

FIG. 2 illustrates the establishment and utilization of an audio and video session 200, in accordance with an embodiment of the present invention. The present illustration assumes the previous coupling of telephone handset 102 (FIG. 1) to audio and video communication device 104 (FIG. 1) and the registering of a network address, such as an IP address, associated with audio and video communication device 104. Referring to FIG. 2, a query 204 monitors for the telephone handset 102 (FIG. 1) to go to an off-hook status whereupon DTMF detection 302 monitors for the sequence of numerals of a phone number. A query 304 determines when a full sequence of numerals has been received.

Following the acquisition of a full sequence of numerals, a network or IP address query 306 retrieves the network or IP address from IP phone number lookup database 128 (FIG. 1) which corresponds to the sequence of numerals identified as a phone number. The network or IP address is received 308 and a call sequence is initiated 310 to the network or IP address as retrieved from the IP phone number lookup database 128. If the call is not answered 312, once the telephone handset 102 (FIG. 1) returns on-hook then processing returns back to query 204 an off-hook status, however, if the call is answered then an audio/video channel is opened 210 with the network 106 (FIG.1). Audio and video data is transceived 212 over network 106 in accordance with a selected voice and video standard, an example of which is voice and video over IP. Other acceptable session standards include H.323 and SIP as well as proprietary protocols, the specifics of which are available and understood by those of ordinary skill in the art. A query 214 determines when the telephone handset 102 goes back on hook signaling the desired termination of the audio and video session 200 and the transport protocols followed by the closing 216 of the network channel ending the established audio and video session 200.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An audio and video communication device, comprising:
    a first interface for transmitting and receiving voice and image data over a network;
    a second interface for compatibly coupling and interoperating with an independently operable voice-only telephone handset, said telephone handset inputting and outputting an audio portion of an audio and video communication session; and
    a controller coupled with both said first and second interfaces, said controller configured to establish said audio and video communication session over one of a wide area or local area network in response to said telephone handset going off-hook, said controller further configured to, upon powering up, retrieve an assigned network address and upon receipt of the assigned network address, transmit the assigned network address to a remote database for correlation with an assigned phone number of the audio and video communication device stored in the remote database.

2. The audio and video communication device of claim 1, further comprising a remote control interface coupled to said controller and configured to modify operation of said controller.

3. The audio and video communication device of claim 1, further comprising:
    a video input interface coupled to said controller and configured to interface with a video input device; and
    a video output interface coupled to said controller and configured to interface with a video output device.

4. The audio and video communication device of claim 3, further comprising the video input device coupled to said video input interface.

5. The audio and video communication device of claim 3, further comprising the video output device coupled to said video output interface.

6. The audio and video communication device of claim 1, wherein said second interface is configured to be compatible with a POTS interface for operably coupling with said telephone handset.

7. The audio and video communication device of claim 6, wherein said controller is further configured as responsive to DTMF tones generated by said telephone handset.

8. The audio and video communication device of claim 1, wherein said first interface is configured to be compatible with a voice-over-IP interface.

9. The audio and video communication device of claim 1, wherein said independently operable voice-only telephone handset is integrated with said audio and video communication device.

10. A video conferencing system, comprising:
    an independently operable voice-only telephone handset; and
    an audio and video communication device, including a controller configured to support an audio channel with said telephone handset, a video channel, and an audio and video channel including an audio and video communication session with a network capable of coupling said videoconferencing system with a remote system, said controller further configured to establish said audio and video communication session over one of a wide area or local area network in response to said telephone handset going off-hook, said controller further configured to, upon powering up, retrieve an assigned network address and upon receipt of the assigned network address, transmit the assigned network address to a remote database for correlation with an assigned phone number of the audio and video communication device stored in the remote database.

11. The videoconferencing system of claim 10, wherein said audio channel is configured according to a POTS interface.

12. The videoconferencing system of claim 11, further comprising an off-hook detector configured to notify said controller and responsive to said telephone handset.

13. The videoconferencing system of claim 10, wherein said audio and video channel is configured according to a voice-over-IP standard as supported by said network.

14. The videoconferencing system of claim 10, wherein said video channel comprises:
    a video input interface coupled to said controller and configured to interface with a video input device; and
    a video output interface coupled to said controller and configured to interface with a video output device.

15. The videoconferencing system of claim 14, further comprising the video input device coupled to said video input interface.

16. The videoconferencing system of claim 14, further comprising the video output device coupled to said video output interface.

17. The videoconferencing system of claim 10, wherein said audio and video channel is configured to communicate with a data network.

18. The videoconferencing system of claim 10, wherein said independently operable voice-only telephone handset is a cordless telephone handset.

19. The videoconferencing system of claim 10, wherein said independently operable voice-only telephone handset is configured to operate at signal levels compatible with said controller.

20. A method for establishing an audio and video communication session, comprising:
- retrieving a first network address assigned to a first communication device from a network upon powering up said first communication device;
- transmitting said first network address to a remote database upon receipt of said first network address for correlation with an assigned phone number of said first communication device stored in said remote database;
- detecting a telephone handset going into an off-hook status and a dialed phone number sequence associated with a second communication device;
- retrieving a second assigned network address from said remote database corresponding to said dialed phone number sequence associated with said second communication device; and
- initiating a call sequence corresponding to said network address to establish said audio and video communication session over one of a wide area or local area network.

21. The method of claim 20, wherein said retrieving includes accessing a remote database comprising said network address corresponding to said dialed phone number sequence.

22. The method of claim 20, wherein said initiating a call sequence is compatible with one of H.323, SIP, and proprietary protocols.

23. The method of claim 20, wherein said initiating a call sequence comprises:
- opening both an audio channel for exchanging audio data with said telephone handset and a video channel for exchanging video data with video input and output devices when said telephone handset is off-hook;
- opening an audio and video channel with a network; and
- transceiving said audio data and said video data over said audio and video channel during said audio and video communication session.

* * * * *

UNITED STATES PATENT AND TRADEMARK OFFICE
CERTIFICATE OF CORRECTION

PATENT NO. : 7,609,286 B2  Page 1 of 1
APPLICATION NO. : 10/754104
DATED : October 27, 2009
INVENTOR(S) : Cupal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 692 days.

Signed and Sealed this

Fourteenth Day of December, 2010

David J. Kappos
*Director of the United States Patent and Trademark Office*